Oct. 1, 1935.　　　A. B. WINCHELL　　　2,015,737
ELECTRIC PHONOGRAPH
Filed April 16, 1932　　6 Sheets—Sheet 1

INVENTOR
Arthur B. Winchell
BY HIS ATTORNEY

Oct. 1, 1935.　　A. B. WINCHELL　　2,015,737
ELECTRIC PHONOGRAPH
Filed April 16, 1932　　6 Sheets-Sheet 4

INVENTOR
Arthur B. Winchell
BY HIS ATTORNEY

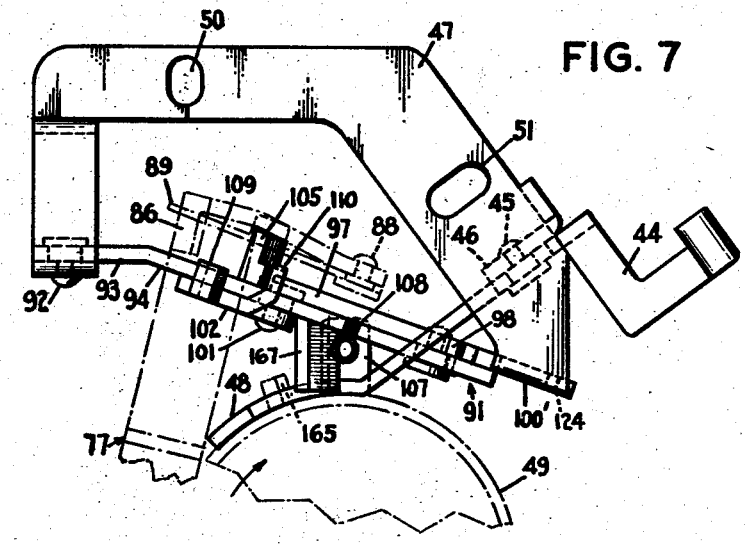
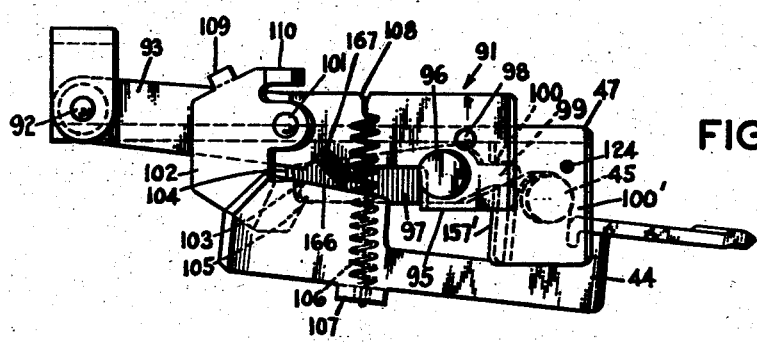
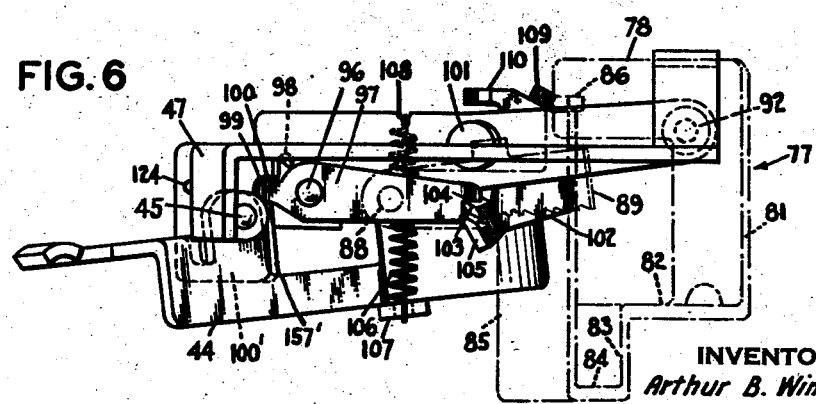

Oct. 1, 1935.  A. B. WINCHELL  2,015,737
ELECTRIC PHONOGRAPH
Filed April 16, 1932    6 Sheets-Sheet 6
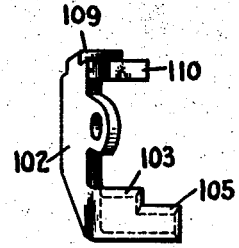
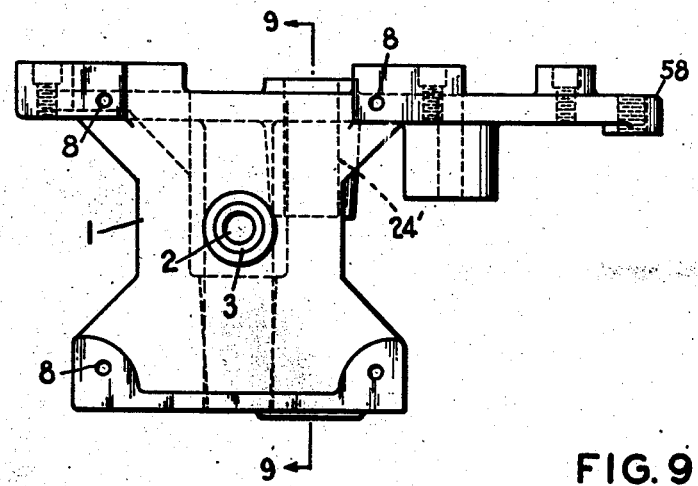
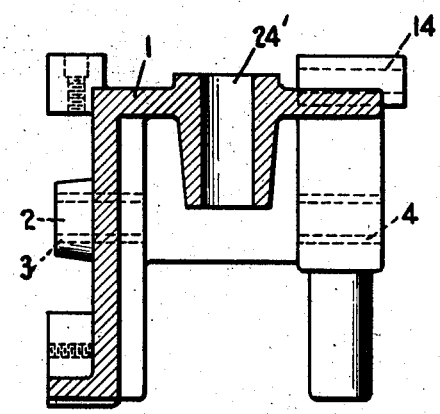
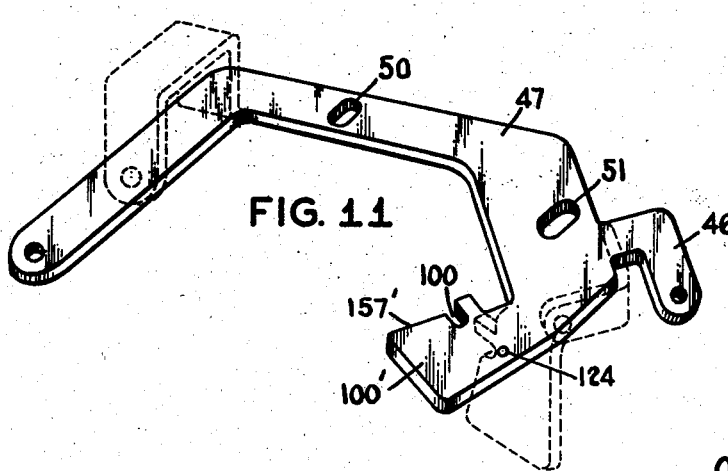
INVENTOR
Arthur B. Winchell
BY
ATTORNEY Patented Oct. 1, 1935

2,015,737

UNITED STATES PATENT OFFICE 2,015,737

ELECTRIC PHONOGRAPH

Arthur B. Winchell, Jackson, Mich., assignor, by mesne assignments, to Radio Corporation of America, New York, N. Y., a corporation of Delaware Application April 16, 1932, Serial No. 605,598

20 Claims. (Cl. 274—10)

This invention relates to electric phonographs and more particularly to phonographs adapted to feed and play consecutively the records placed in supply position.

Automatic electric phonographs adapted to play a series of records have long been known but the cost has been relatively high.

It is one of the objects of this invention to simplify the mechanical operation and parts of the phonograph to enable one to produce an automatic phonograph at low cost and at the same time improve the mechanical efficiency of the apparatus.

A further object is to minimize space required by storing the records on the turntable.

Other objects will appear in the following description, reference being had to the drawings in which:

Fig. 5 is a detailed elevation of the catch and trip mechanism.

Fig. 6 is rear view of the apparatus shown in Fig. 5.

Fig. 7 is a plan view of the apparatus of Fig. 5, the cam and tone lever arm being shown in broken lines.

Fig. 8 is a view of the main casting being viewed parallel to the motor axis, as shown in Fig. 3.

Fig. 9 is a crossed section taken through the turntable bearing on lines 9—9 of Fig. 8.

Fig. 11 is a view of the stamping that forms the support for the trip before certain of the parts are bent into final position.

Fig. 12 is an end view of the trip shown in Fig. 6.

Figs. 13, 14, 15 are diagrammatic illustrations to explain the theory of operation of the speed control for the motor.

Figure 1:
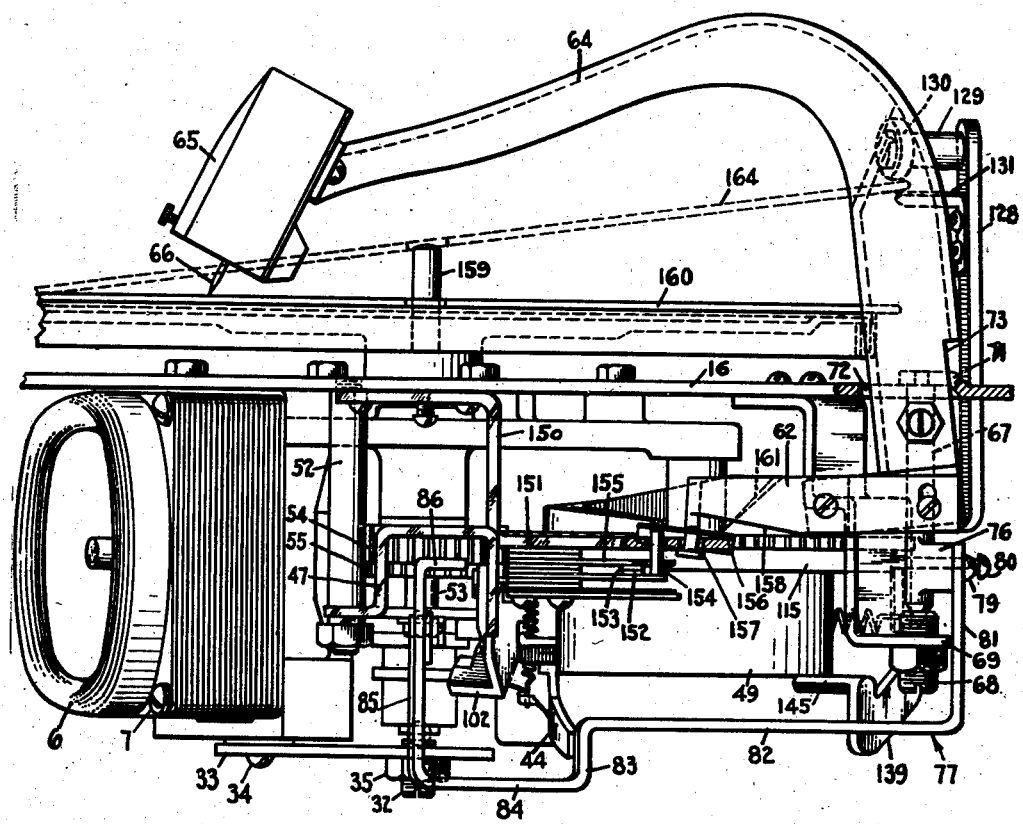
Fig. 1 is a side elevation of the phonograph apparatus.

The greater part of the elements are supported in a main casting 1 (Figs. 8 and 9) which has a central opening 2 in which are located two bearing sleeves, 3, 4, adapted to receive the shaft 5 of the motor 6. The motor 6 is attached to the casting by means of four screws 7 (only two being shown in Fig. 3) which thread into four holes 8 in the main casting (Fig. 8). The motor shaft has a screw worm 9 shown in dotted lines in Fig. 3 which is preferably cut directly in the shaft.

On the outer end of the shaft 5 is mounted a disk having a collar or hub held to the shaft by a pin or set screw. The rotating part of the speed regulator consists of a disk having teeth or prongs 11 (Fig. 4). The prongs of this disk are aligned to rotate between the pole pieces 12 and 13 (Fig. 3) energized by a coil 13' connected to a source of alternating supply, say the 60 cycle supply of the usual lighting circuit. The motor may be of any type, either spring, electric or otherewise, but I have illustrated an electric motor preferably of the induction type to be directly connected to the said source of supply. To give a variable braking action the field parts are pivoted at 14 to the main casting. The poles of the field are adapted to be adjusted about this pivot point 14 by means of a screw 15 threaded through the upper plate 16 attached to the main casting by four screws 17, two only being shown in Fig. 4. These bolts screw into the holes 18 shown in Fig. 3.

Figure 3:
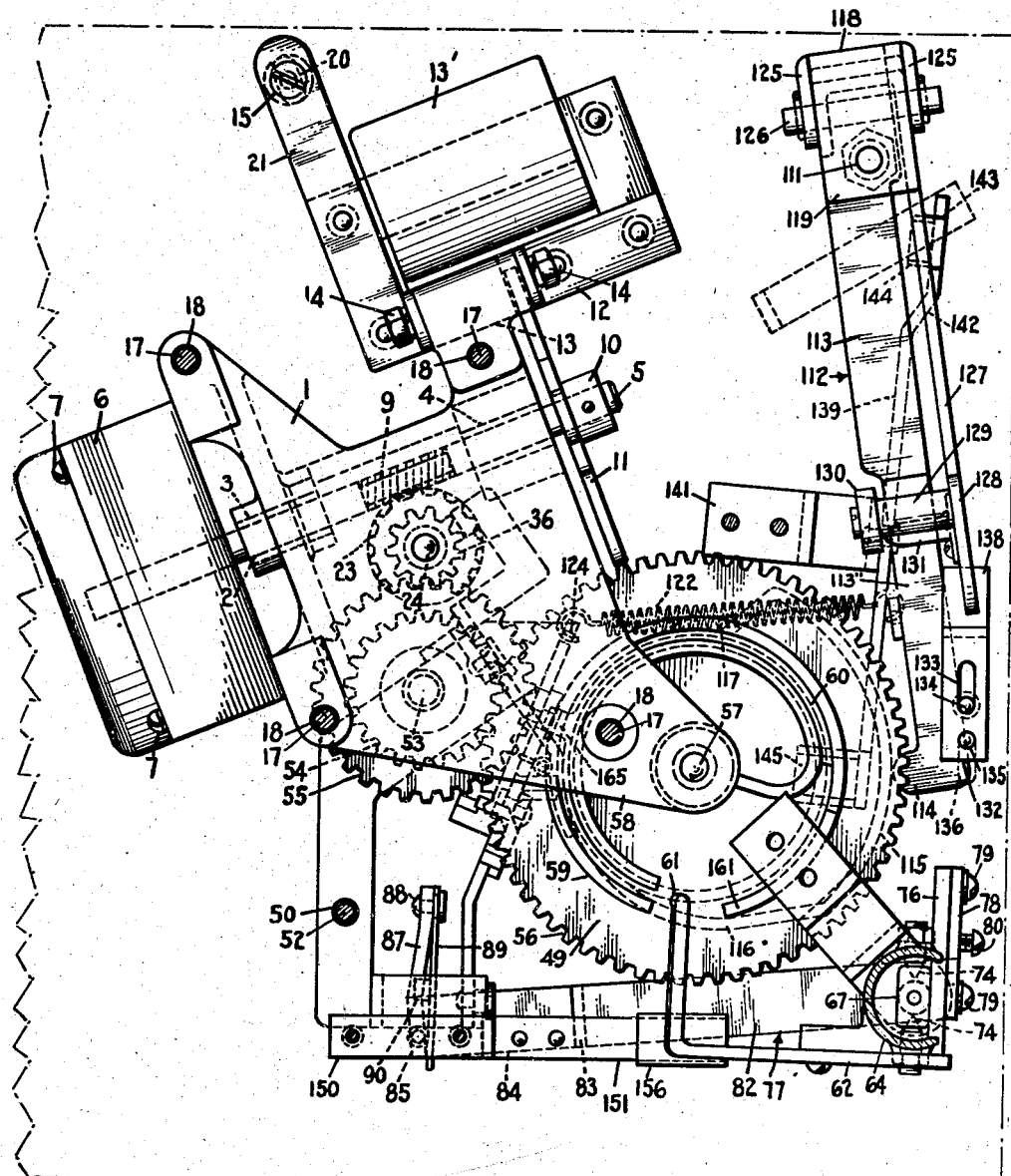
Fig. 3 is a plan view of the apparatus shown in Fig. 1, the records being removed and the supporting plate form indicated in broken lines.
Figure 4:
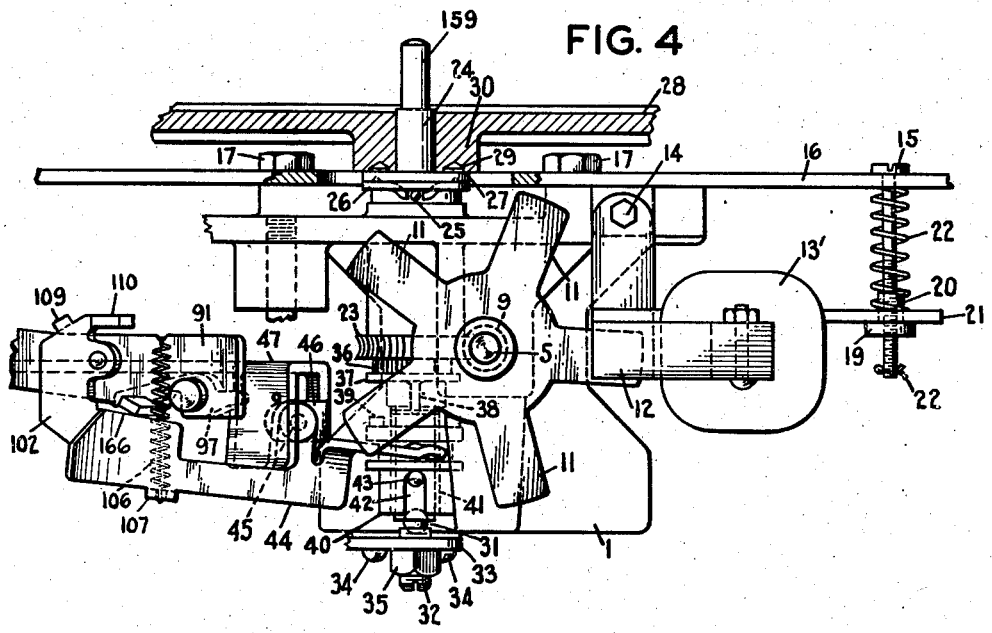
Fig. 4 is an end view of the speed regulator attached directly to the motor shaft.

The screw 15 threads through a sleeve or nut 19 which has a flattened shank 20 shown in dotted lines in Fig. 3. This shank fits in an opening in an arm 21 in such a way that the nut is held from turning but is loose enough to permit the nut and screw to move the field frame about the pivot point 14. A spring 22 encircles the screw 15 and bears at one end against the arm 21 and at the other against the upper plate 16. A cotter pin 22 may be used in the screw 15 to prevent it from being threaded completely out of the nut 19.

By turning the screw 15 the field poles may be rotated about the point 14 and thus adjust the amount of flux that will pass across the gap between the poles and through the teeth 11. These teeth 11 should be of some good conducting material such as copper. The worm 9 meshes with a worm gear 23 (Figs. 3 and 4) pinned, keyed or otherwise rigidly fastened to turntable shaft 24. This shaft makes a bearing fit with the opening 24' in the main casting (Figs. 8 and 9). The shaft at the upper end has a pin 25 seated in a groove in the collar 26. On this collar rests a washer 27 preferably of soft rubber which acts as the driving connection for the superposed turntable 28. To increase the clutching action a series of depressions 29 may be formed in the hub 30 of the turntable. It should be noted in this case that there is no rigid connection between the turntable shaft and the turntable but the frictional driving means is such that the turntable will rotate when the shaft rotates unless some accidental engagement prevents it from turning, at which time the driving means will slip.

The lower end of the turntable shaft has a ball 31 seated therein. This ball rests in a depression in an adjusting screw 32 threaded in a small plate 33 fastened to the lower part of the motor frame by screws 34. By adjusting the screw 32 the turntable shaft may be adjusted, after which the lock nut 35 holds the adjustment. Rotatably fitting on the turntable shaft 24 is a pinion 36 having a shroud 37 and two or more clutch teeth 38 which are adapted to be engaged by clutch teeth 39 on the clutch part 40 slidably fitting on a thin bushing 41 which taken with the worm gear 23 serves to position the pinion 36 vertically while permitting it to rotate on the turntable shaft.

The clutch part 40 has a slot 42 in which fits a pin 43 extending through the bushing 41 and the turntable shaft. When the clutch is in lowered position, as shown in Fig. 4, the teeth 38 are out of engagement with the teeth 39 and rotation of the motor and turntable shafts will not rotate this pinion. When the clutch is in elevated position the said sets of teeth are in engagement with each other, and when the motor and turntable shafts rotate pinion 36 must also rotate.

A clutch lever 44 is pivoted at 45 to an ear 46 of a support bracket 47 (Figs. 7 and 11). This clutch lever has a head 48 of arcuate shape to conform to the circular contour of the cam 49.

The support bracket 47 has two holes 50 and 51. The hole 50 receives one end of a supporting stud 52. The other end of the stud 52 is threaded into the supporting plate 16. The other hole 51 receives one end of an intermediate gear stud 53. These two studs support the clutch and trip mechanism of Figs. 5, 6, and 7.

Figure 2:
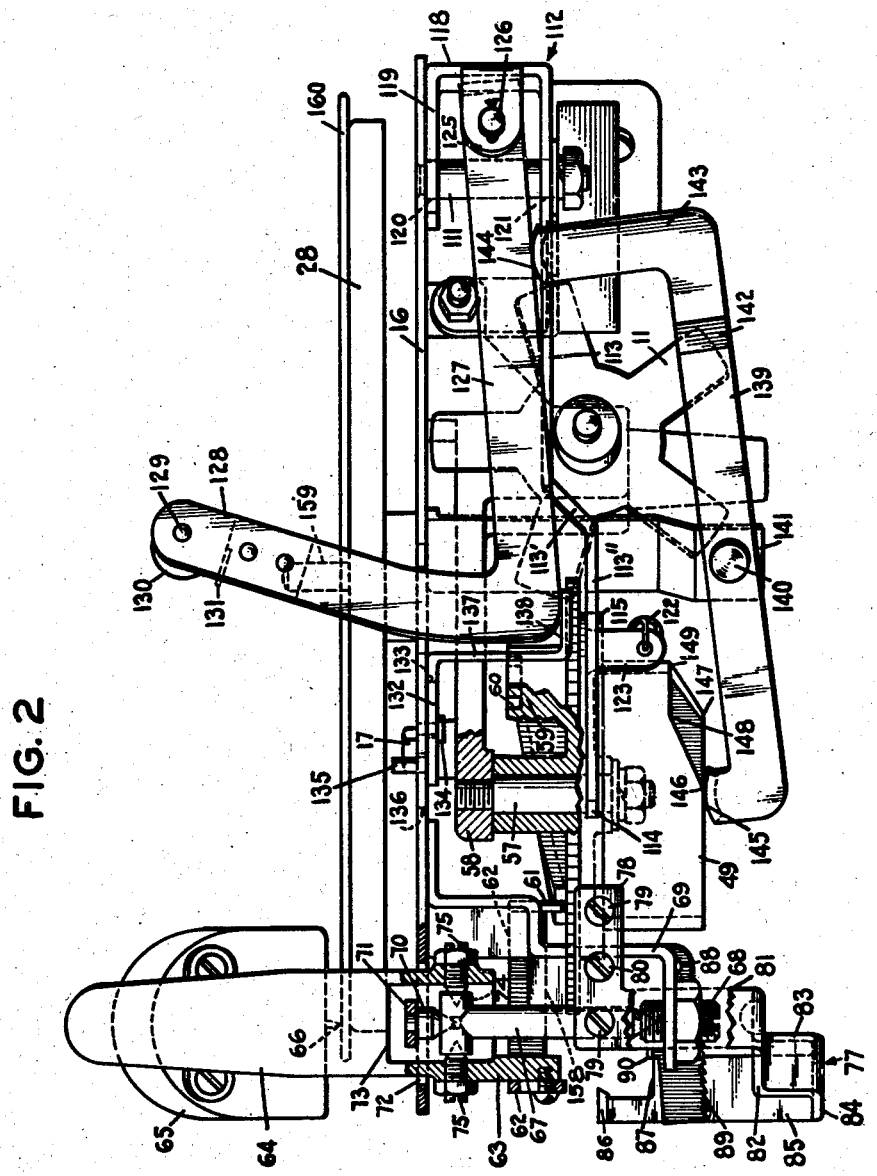
Fig. 2 is a rear view of the apparatus shown in Fig. 1.
Figure 10:
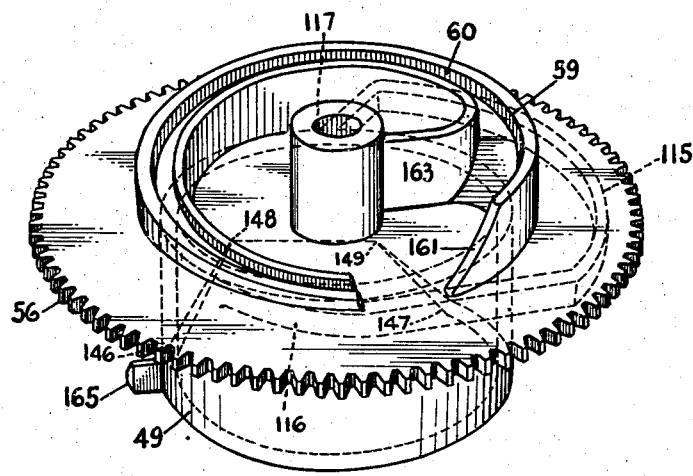
Fig. 10 is a perspective view of the cam.

On the stud 53 is journalled the intermediate gear consisting of two gears 54, 55. These gears travel as a unit and they are preferably die cast as one unit. The gear 55 meshes with the pinion 36 and the gear 54 meshes with the gear 56 formed integrally with the cam 49 (Fig. 10). The cam is supported on a stud 57 threaded into the arm 58 of the main casting. The cam 49 on its upper surface has a ridge 59 in which is a groove 60 adapted to receive the point 61 of the follower arm 62 (Fig. 2). This follower arm is fastened to the lower part 63 of the pickup arm 64, which has at its free end a pickup mechanism 65 operated by a needle 66 in a well known way. The mechanism of the pickup may be of any standard form and it is not described as it forms no part of this invention. The pickup arm is pivoted for universal movement by the following means.

A swivel post 67 of T-shape supports the pickup arm. At its lower end this swivel post has a cone that fits in an adjusting screw 68 threaded through a bracket 69 fastened to the top plate 16. The upper part of the swivel post has a conical socket in which fits a cone 70 fastened to a small lug 71 struck up from the top plate 16 (Fig. 1). The pickup arm rotates in a hole 72 generated from a center passing through the swivel post (Fig. 1) and except for the lug 71 all of the metal is punched out for reception of the pickup. The pickup arm is hollow, as indicated in Fig. 1, for reception of the pickup wires (not shown). The back side of the lower part of the pickup arm is cut away at 73 so that the lug 71 extends through the cutaway part into the center of the hollow in the pickup arm. By this arrangement the pickup arm has sufficient rotary movement to perform its usual function. The upper part of the swivel bracket has two conical sockets 74 receiving two adjusting screws 75 threaded through the lower sides of the pickup arm. The pickup arm thus may rotate in a vertical plane about the points of the screws 75 and may rotate in a horizontal plane about the pivotal points of the stud 70 and screw 68, thus giving universal movement.

The lower part of the swivel post 67 has an arm 76 (Figs. 1 and 3) to which is fastened a pawl arm 77. This pawl arm is irregular in shape. It has a base portion 78 receiving two screws 79 and another screw 80. The two screws 79 pass through holes in this head portion and are threaded into the arm 76. The screw 80 is threaded through the head 78 and abuts against the arm 76. By loosening either the one or the other of the screws 79 and threading in the screw 80, or vice versa, the pawl arm 77 may be adjusted in position. The pawl arm extends downwardly at 81 (Fig. 1), then horizontally at 82, then downwardly at 83, horizontally at 84, vertically at 85 and horizontally in a reverse direction at 86. The vertical portion 85 has an arm 87 extending at right angles to it (Fig. 3) and to this arm at 88 is pivoted a saw-toothed trip 89 having a projection 90 bent at right angles and overlapping the arm 87 so as to limit this movement under the influence of gravity.

Returning to the trip mechanism of Figs. 5, 6, and 7, a throw-out lever 91 is pivoted in the support bracket 47 at 92. This lever has a portion 93 extending at right angles to the pivot 92 and thence is bent at a slight angle at 94. The end of the lever has a depending head portion 95 in which is pivoted at 96 a trip dog 97. This head also has a stop pin 98 adapted to engage a tongue 99 of the trip dog and limit its downward movement when tripped in a way to be later described. This tongue 99 seats in a notch having the upper lip 100 in the head 100' of the support bracket 47. Pivoted to the throw-out lever 91 at 101 is a latch 102. This latch has a knife edge 103 adapted to engage the catch 104 of the trip 97. It also has another knife edge 105 in a lower plane to engage the saw-teeth of pawl 89. A spring 106 has one end fastened to a turned over ear 107 on the clutch lever 44 and the other end fitting in a notch 108 in the throw-out lever. The latch 102 has an arm 109 bent at right angles to extend over the top of the throw-out lever 91. An arm 110 also is bent at right angles from the top portion of the latch to extend over the top of the throw-out lever. These two arms permit the latch to have a limited movement about its pivot point 101 to act as positive stops at the limits of movement. The arm 110 is also adapted to be engaged by the projection 86 on the pawl arm 77.

A pivot stud 111 depends from the top plate 16 and on it is pivoted a horizontal discard lever 112. This lever has a horizontal portion 113 in a plane parallel to the top plate 16. It is then bent downwardly at an angle at 113' and thence horizontally at 113". On the end of the arm 113" is a cam end 114 adapted to engage the cam surface 115 shown more clearly in dotted lines in Fig. 3. This cam surface starts at the point 116 and ends at the point 117, and between these two points the surface is cylindrical. The horizontal portion 113 of the horizontal discard lever is bent to extend vertically at 118 and thence horizontally at 119. The pivoted stud 111 passes through holes 120 and 121 in the horizontal discard lever and permits this lever to move in a horizontal plane when the cam head 114 engages the cam surface 115. A spring 122 has one end fastened to an ear 123 bent at right angles from the horizontal portion 113 (Fig. 2) and the other end fastened in a hole 124 of the support bracket 47. The cam 115 therefore moves the horizontal discard lever 112 counter clockwise about the pivot 111 in Fig. 3 and the spring 122 returns it clockwise when the cam head 114 recedes with the cam surface 115.

The vertical portion 118 of the horizontal discard lever has two ears 125 bent at right angles thereto. Pivot pin 126 passes through holes in these ears and on the pivot pin is pivoted the horizontal portion 127 of the vertical discard lever. This vertical discard lever has an upstanding portion 128 in the end of which is fastened a stud 129. Roller 130 is rotatably secured to this stud and is adapted to engage the topmost record and limit the downward motion of the vertical discard lever. The vertical portion 128 also has a tongue 131 that terminates short of the roller. When the discard lever drops until the roller 130 engages the topmost record the tongue is in line with the lower surface of this record.

To prevent the discard lever from lowering and thus getting into position to eject a record a repeat lever 132 is used. This repeat lever has a slot 133 through which extends a headed screw 134. This screw threads into the top plate 16. The repeat lever has an upstanding finger piece 135 which extends through a slot 136 in the plate 16. The repeat lever extends downwardly in a vertical direction at 137 and thence horizontally at 138 in position to lie under the horizontal portion 127 of the discard lever when the finger piece 135 is pushed vertically in Fig. 3. In this position the discard lever cannot lower by force of gravity to discard a record and the record will be repeated.

The vertical discard lever 128 is turned clockwise in Fig. 2 against the force of gravity by an elevating lever 139 pivoted at 140 to a bracket 141 supported from the top plate 16. The elevating lever has the upper end in Fig. 3 offset at 142 from which it further extends in a vertical direction in this figure. Then at right angles to this portion is a projection 143 which has a turned over end 144 that lies under the vertical discard lever 127. The lower end of the elevating lever in Fig. 3 has a turned-over end 145 that passes beneath the cam edge of the main cam 49. In Fig. 2 the cam surface lies in a horizontal plane to the left of points 146 and 147 and to the right of these points the cam is irregular. It slopes upwardly from point 146 to point 148 and thence horizontally to the point 149 and then downwardly to the point 147.

The bracket 150 (Fig. 1) is fastened to the top plate 16. The horizontal portion 151 of this bracket carries a stop switch consisting of two contacts 152, 153, mounted on arms that are insulated from each other and each one of which is connected in circuit (not shown) of the driving motor 6. Either one or both of these contact arms may be leaf springs. An insulation pin 154 passes through a hole in the guiding strip 155 and extends upwardly in position to engage an operating channel plate 156. This channel plate is held to the bracket 150 by a headed rivet 157. The plate 156 is adapted to be engaged by the horizontal follower arm 62. When the pickup arm descends below the level of the turntable due to the fact that no record is on the table the weight of the pickup arm will then push downwardly on the channel 156 and pin 154 to separate the contacts 152 and 153 and stop the motor.

The speed regulator is claimed in my copending application filed March 4, 1932, Serial No. 585,706, and is not claimed herein.

Having described the details of the phonograph the method of operation will now be explained.

The motor having been previously stopped by absence of a record on the turntable, the clutch mechanism will be in released position, as will later be explained. To start the phonograph the user will move the pickup arm to the left in Fig. 2 at which time the follower point 61 will be free of the groove 60 and will be just clearing the flange of the gear 56. The bottom edge 158 of the follower arm will be resting on the channel bar 156 (Fig. 1) and switch contacts 152, 153 will be open. The motor therefore will be de-energized. A supply of records will be placed on the turntable with pin 159 extending through the holes in the center of the records. A considerable number of records may be placed on the turntable but for illustrative purposes I have only shown in full lines one record 160 on the turntable in Fig. 1. The user will now raise the pickup arm 64 which will immediately start the motor because the raising of the pickup arm permits the spring strips to close the contacts 152, 153, when pressure is removed from the insulation pin 154. As soon as the motor starts the turntable commences to revolve because of the permanent connection between the turntable and the motor through gear 23 and worm 9. The cam 49 remains stationary at this time because the clutch by supposition is open (Fig. 4). The user will then move the pickup arm until the needle 66 rests in the beginning of the record groove. The record will be played in the usual way and when finished the needle will enter the discard groove at the center. At present there are two types of discard grooves in general use with records. One of these is an eccentric circular groove into which the playing groove leads. Another is a spiral groove leading from the playing groove toward the center of the record.

Let it be assumed that the record has the eccentric type of discard groove. The needle therefore will be led into this eccentric circular groove when the playing ceases. One complete turn of the record will then swing the needle and the connected pickup arm quickly inwardly and again outwardly as the needle follows this eccentric discard groove. As the pickup arm swings outwardly the connected pawl arm 77 will likewise move outwardly. When the discard groove causes the pawl arm 77 to move inwardly the slanting teeth of dog 89 (Figs. 2 and 5) glide over tooth 105 on latch 102 without disturbing the clutch mechanism. However, as the pawl arm 77 moves outwardly the slanting teeth of the pawl engage the tooth 105 of the latch 102 and move it around its pivot point 101 counter-clockwise in Fig. 5. This frees the tooth 103 from the notch 104 and permits the weight of the clutch and throw-out levers and connected parts to drop downwardly and elevate the clutch member 40. During this movement the tooth 99 slides down edge 157'. Pin 98 limits the movement of the dog 97. This brings the teeth 39 into engagement with the teeth 38. Pinion 36 is now forced to rotate and it in turn rotates the cam 49 through the intermediate gears.

As the cam starts to rotate the slanting surface 161 engages the bottom edge 158 of the follower arm and immediately elevates the pickup arm and needle a considerable distance above the records. The follower arm 62 then engages the wall 163. This forces the pickup arm quickly out to the outer edges of the grooves on the next record. At about this time the cam head 145 passes down the slanting surface between the points 146 and 148 (Fig. 2) of the skirt of the cam and permits gravity to lower the discard arm 128 until the roller 130 rests upon the topmost record. Also at about this time the cam surface 115 (which is the surface between points 116 and 117) engages the cam head 114 of the horizontal discard arm 112. This quickly moves the vertical discard arm 128 about the pivot stud 111. This brings the roller 130 out to the outer edge of the topmost record. It is preferable to so proportion the parts that this outward movement will take place before the roller 130 is lowered to rest on the topmost record. As the cam continues to rotate the cam head 114 will finally ride down the slanting cam surface toward the point 117. Spring 122 then moves the horizontal discard arm 112 and the connected vertical discard arm 128 to the left in Figs. 1 and 3. This will force the tongue or wedge 131 beneath the topmost record. The rotation of the cam now brings the cam head 145 of the elevating lever 139 (Fig. 2) down the slanting surface between points 149 and 147 and the discard arm 128 is raised upwardly, as shown in Fig. 1. This movement will continue until the played record is fully free of the center pin 159. As soon as the record is thus freed from the pin, rotation of the turntable revolves the inclined record 164 with the roller and tongue as a center point and discards it into a hopper or receptacle (not shown). During this time the follower pin 61 is trailing along the groove 60 of the ridge 59. The latter portion of this groove 60 slants downwardly toward the gear flange of the cam 49 and finally brings the needle 66 adjacent the beginning of the sound groove into which it is immediately drawn and the next record starts playing. During this final movement of the cam the discard lever 128 remains elevated because the cam head 145 is following the horizontal portion of the skirt between the points 147 and 146. Also during the last movement of the cam the projecting lug 165 thereon (Fig. 7) moves along the top edge 166 of the clutch lever head 44 until it engages the slanting lug 167 projecting from the throw-out lever 91. This turns the throw-out lever about its pivot point 92 and brings the point 99 of the dog 97 against the protruding upper lip 100 and the dog 97 is forced to rotate about its pivot point 96 and the latch 102 moves clockwise in Fig. 6 until the notch 103 snaps under the tooth 104. The rotation of the dog 97 is limited by the tongue 99 engaging the stop pin 98. Just after this occurs the cam lug 165 on the cam 49 passes out from between the projection 167 and the clutch lever head 97. The throw-out lever and connected parts, however, cannot drop downwardly again because the engagement of notch 100 with tooth 99 prevents this. Just as soon as the cam lug 165 passes free of cam head 97 spring 106 snaps the clutch lever 44 around its pivot point 45 and opens the clutch by disengaging the teeth 39 from the teeth 38. This happens about the time the pickup arm is lowered to bring the needle 66 against the topmost record. When the needle is lowered against the record adjacent the beginning of the playing groove the playing of the next record immediately starts and this record will be played in the usual way, as previously described.

Let it be assumed that this next record has a spiral discard groove. When the needle reaches the end of the playing groove it will be led into this spiral groove and quickly drawn toward the center of the record. This will bring the projection 86 (Figs. 2 and 5) against the arm 110 which will cause the latch 102 to rotate about its pivot point 101. This will free tooth 104 of the latch 97 from the notch 103 of the trip dog 102. The weight of the throw-out lever 91 and the connected parts will thus cause the throw-out lever to move around its pivot 92 while the point 99 of the dog 97 slides free of the notch 100 and down edge 157' of the stationary bracket 47. This movement also rotates the clutch lever about the point 45 as previously described and brings the clutch teeth 39 into engagement with the teeth 38. This causes the rotation of the main cam 49 which brings about a sequence of results already described.

From the foregoing it will be evident that the series of records on the turntable will be played one after another no matter whether the records have a spiral or concentric discard groove. When the last record is played and discarded from the turntable the pickup arm will be brought downwardly, as previously described, but there being no record for the needle 66 to rest on, the lower edge 158 of the follower arm will engage the channel bar 156 and force the contacts 152 and 153 apart by engaging the insulation pin 154. These switch contacts being in the circuit of the motor, the motor will stop.

To start the phonograph again the user will place a supply of records on the turntable and the operation previously described will be repeated.

If the user desires that a record be repeated button or finger piece 135 will be moved to the right in Fig. 2. This will bring the horizontal portion 138 of the repeat lever beneath the vertical discard arm 128. When the record that is being played is finished all of the operations previously described will be repeated except that discard arm 128 is prevented from lowering as the elevating arm 139 is lowered. Therefore the eject arm cannot discard the record. The pickup arm is then lowered to bring the needle into position on the record that has just been played. The record will thus be played over again and it will be repeated as long as the repeat button is left in the repeating position.

If the user desires to stop the instrument before the supply of records on the table is exhausted the pickup arm will be raised slightly and move outwardly clear of the records and then lowered until the edge 158 of the follower arm engages the channel bar 156 and separates the contacts of the motor switch which will stop the motor. To start the instrument again the user would reverse the process by raising the pickup arm and depositing it at the beginning of the playing groove of the topmost record.

If the operator is dissatisfied with the record being played, the playing may be stopped at once by resting the pickup arm and either moving it quickly toward the center pin or by oscillating it slightly. The first movement will discard the record as though the needle had entered the spiral discard groove. The second one will discard it as though the needle had entered an eccentric groove.

The phonograph mechanism may be used with any type of speed control but I have developed a special form that gives excellent control of the speed and I therefore prefer to use it. This speed control I call a "synchronator". Its theory of operation will now be given.

The particular source of power in the example given is an induction motor, say of the squirrel cage type, assumed to operate on 60 cycle current. This 60 cycle current is used to energize the synchronator coil 15. Twice each cycle the flux will rise to maximum value. In each minute of time there will be 7200 times that the flux will reach a maximum and likewise fall to zero.

The motor is designed to run at about 1600 R. P. M. at normal load if there were no braking action. To obtain the regulating braking action the motor shaft is preferably held to some speed less than 1600. By using five prongs or teeth in the disk a tooth can be positioned in the center of the field of the pole pieces 12, 13, during each zero value of the flux if the shaft has a speed of $$\frac{7200}{5}$$

or 1440, and the theory will be explained with this construction of the regulator when the motor shaft 5 is rotating at 1440 R. P. M.

Fig. 13 shows the location of the teeth of the synchronator at maximum value of the flux with the teeth 170, 171, equidistant from the center line of the field poles. When the flux is next at maximum the teeth 171, 172 will have moved up to the equidistant position and in turn the pairs of teeth 172, 173 and 173, 174, will assume that position. When the shaft is thus rotating at 1440 R. P. M. there is maximum braking action. The flux induces currents in the moving teeth 171, 172 (for example) of equal value because they are equidistant from the center line of the field. These currents produce a field that reacts with the field of pole pieces 12, 13. The reaction with the field of tooth 170 is such as to tend to repel the disk counter-clockwise. The reaction with the field of tooth 171 is such as to tend to repel the disk clockwise. This is true because the reaction between two coils of a transformer, and this is a transformer action, is such as to remove the coils out of magnetic relation with each other. Since the teeth are equidistant from the center of the field these two forces are balanced and there is no tendency to either speed up or retard the rotation of the disk at maximum value of the flux. As the flux decreases the tooth 170 will recede and tooth 171 will approach the center of the field flux. At this time the reacting fields of these two teeth will be unequal and there will be a braking action decreasing to zero when the tooth reaches the center line of the pole pieces 12, 13. This will tend to slow the shaft 3 down but as the tooth 171 passes beyond the center line there will be an equal tendency to speed it up. During each one-fifth of a revolution these two impulses will balance out and the net result is that the shaft 3 has its number of revolutions neither decreased nor increased.

If we assume that a decreased load is placed on the motor, the shaft 5 tends to speed up and when there is maximum flux in fields 12, 13, the tooth 172 will be nearer the center line of the flux than will tooth 171, as shown in Fig. 14. The reaction of the currents induced in these two teeth will be unequal. The field will therefore repel tooth 172 and slow the shaft down to the correct speed 1440 R. P. M.

In this case it should be noted that as the center of tooth 172 approaches the center of field 12, 13, the force exerted in a clockwise direction is greater than the force exerted in a counter clockwise direction after the center is passed. This is true because the field flux is decreasing during the approach and zero flux is not reached until the tooth has passed the center. The forces will therefore not balance and there will be a continuous braking action.

If we asume that an increased load is placed on the motor, the shaft 5 tends to slow down and at the time of maximum flux the teeth 173, 174, will appear as in Fig. 15. The reaction due to tooth 173 is thus stronger than that of tooth 174 because it is nearer the center line of the field. The disk will therefore tend to rotate counter-clockwise. The action will continue until the disk again rotates at 1440 R. P. M. It should be noted that the reaction due to tooth 173 as it recedes will not be balanced out by that of tooth 174 as it approaches since the field flux is decreasing to zero during this time. There will therefore be a continuous speeding up of the motor shaft. From the above explanation it will be apparent that the point of minimum braking action is such as to have two teeth spaced equidistant from the center of the field 12, 13, with maximum flux, or viewed in another way, with a tooth centered in the field at zero flux. This is the relation that will be maintained by the synchronator up to the maximum capacity of the particular construction used. This maximum braking capacity may be made of any desired value by properly designing the parts of the regulator.

I may use any number of teeth in the synchronator disk but there is a definite relation with one source of flux in this respect given by the equation $$S = \frac{2f}{T} \times 60$$

where S equals the desired speed in revolutions per minute $f$ equals the frequency or number of cycles per second of the current used to produce the field and T equals the number of teeth in the regulator disk. With 60 cycle current and four teeth the speed would be 1800 R. P. M. and so on.

Instead of having one field and one or more teeth one can get the same action by one tooth and any number of fields, that is, with one tooth only the equation may be $$S = \frac{2f}{P} \times 60$$

where P equals the number of fields.

It will also be evident that I may gear the motor to the synchronator and get any desired speed without changing the number of teeth or fields.

The synchronator as a speed regulator per se is not claimed in this application but is claimed in my copending application Serial No. 585,706, filed January 9, 1932.

Having described my invention, what I claim is:

1. In phonograph trips, a lever having a stationary pivot, a catch pivoted on the lever, a latch on the lever at one end of the catch, an abutment adapted to engage the other end of the catch when the first end is engaged by said latch and to clear said end when the catch is free of the latch, means to move said first lever, and a second abutment adapted to engage the said end of the catch when the lever is thus moved.

2. In phonograph trips, a lever pivoted at one end, a member having an edge with a notch and an overhanging lip, a lever pivoted intermediate its ends on the first lever and having a detent adapted to slide along said edge when the first lever moves about its pivot, means to raise the first lever and cause the detent to abut against said lip whereby the second lever is turned about its pivot and the detent moved into said notch and a latch to engage the other end of the second lever and retain the first lever in its moved position.

3. In phonographs, a motor, a clutch connected to the motor, a lever to operate said clutch, a second lever, a spring connecting said levers, a third lever pivoted to said second lever having one end adapted to engage a stationary fulcrum, a latch adapted to engage the other end and means operated by the motor to separate said first and second mentioned levers and cause said latch to engage the spring to move the second mentioned lever to clutch opening position.

4. In phonographs, a motor, a clutch connected thereto, a pickup, a lever pivoted at one end and having its other end attached to said clutch, a latching lever engaging said lever and adapted to hold it against movement, a trip detent pivoted on said latching lever, means engaging said detent to support said latching lever, a pawl arm connected to said pickup, a pawl pivoted on said pawl arm and having a plurality of teeth slanted to ride over said detent when the pawl arm moves in one direction and to engage the detent and disconnect it from said means when it is moved in the other direction and thereby trip the latching lever.

5. In phonographs, a motor, a clutch connected thereto, a pickup, a lever having one end attached to said clutch, a second lever pivoted at one of its ends, a spring between its other end and the remaining end of the first lever, a catch pivoted on the second lever adapted to hold the said levers in clutch releasing position, an arm connected to said pickup, and means on said arm to operate the catch and permit the levers to move to clutch closing position when said arm is moved inwardly beyond the playing position.

6. In phonographs, a motor, a clutch connected thereto, a pickup arm, a lever pivoted at one end, means to connect the other end of the lever with said clutch, a member having an edge with a notch and an overhanging lip, a lever pivoted intermediate its ends on the first lever and having a detent adapted to slide along said edge when the first lever moves about its pivot, means connected to said motor to raise the first lever and cause the detent to abut against said lip whereby the second lever is turned about its pivot and the detent moved into said notch, a latch pivoted on the first lever adapted to engage the other end of the second lever and retain the first lever in its moved position, said latch having a trip detent, a pawl arm connected to said pickup, a pawl pivoted on said pawl arm and having a plurality of teeth slanted to ride over the trip detent when the pawl arm is moved in one direction and to engage the same and release the latch when the pawl arm is moved in the reverse direction.

7. In phonographs, a motor, a clutch connected to the motor, a lever having connections to the clutch, a catch pivoted to said lever, a supporting member having a notch adapted to engage one end of the catch, a latch on said lever adapted to engage the other end of said catch to hold said clutch open through said connection.

8. In phonographs, a motor, a clutch connected to the motor, a lever having connections to said clutch, a catch pivoted to said lever, means to move the lever to release the clutch, a latch on said lever and a stationary abutment, each adapted to engage an end of said catch, and support the lever with the clutch released.

9. In phonographs, a lever having a pivot, a catch pivoted on said lever, a latch adapted to engage one end of said catch, an abutment adapted to engage the other end of the catch, an arm adapted to trip the latch and free the catch of engagement with said abutment, and means to move said lever and bring said catch into engagement with the abutment.

10. In phonographs, a motor, a clutch connected to the motor, a lever having connections to said clutch, a catch pivoted to said lever, means to move the lever to release the clutch, a latch on said lever and a stationary abutment each adapted to engage an end of said catch, to support the lever with the clutch released, and means to trip the catch and close the clutch.

11. In phonographs, a motor, a clutch connected to the motor, a lever having connections to the clutch, a catch pivoted to said lever, a supporting member having a notch adapted to engage one end of the catch, a latch on said lever adapted to engage the other end of said catch, and means to cause the notch to engage said end to hold said clutch open through said connection.

12. In phonographs, a motor, a clutch connected to the motor, a lever having connections to the clutch, a catch pivoted to said lever, a supporting member having a notch with a protruding edge, means to move said lever to open the clutch, said movement causing one end of said catch to engage said edge and enter the notch and a latch to engage the other end of the catch.

13. In phonographs, a motor, a clutch connected to the motor, a lever having connections to the clutch, a catch pivoted to said lever, a supporting member having a notch with a protruding edge, means to move said lever to open the clutch, said movement causing one end of said catch to engage said edge and enter the notch and a latch to engage the other end of the catch, and means to move the latch to cause said lever and clutch to move to closed position.

14. In phonographs, a motor, a clutch connected to the motor, a lever connected to the clutch, a second lever, a spring connecting said levers, a catch pivoted to the second lever, a supporting member having a notch with a protruding edge, means to move the second lever to open the clutch through the first lever and said spring, said movement causing one end of said catch to engage said edge and enter the notch and a latch pivoted to said second lever and adapted to engage the other end of the catch.

15. In phonographs, a motor, a clutch connected to the motor, a lever connected to the clutch, a second lever, a spring connected to said levers, a catch pivoted to the second lever, a supporting member having a notch with a protruding edge, means to move the second lever to open the clutch through the first lever and said spring, said movement causing one end of said catch to engage said edge and enter the notch and a latch pivoted to said second lever and adapted to engage the other end of the catch, and means to move the latch to cause the said levers to close the clutch.

16. In phonographs, a motor, a turntable, a cam connected to the motor, a lever pivoted for movement parallel to the turntable having one end resting on said cam, a second lever pivoted to the first lever for movement perpendicular to the turntable and having means to engage the edge portion of a record on the turntable, and means connected to the motor to raise the second lever about its pivot to tilt the record above the turntable.

17. In phonographs, a motor, a turntable, a lever pivoted to swing horizontally, a cam connected to the motor and adapted to move the lever in one direction, a spring connected to the lever and adapted to move it in the reverse direction, a lever pivoted to the first lever to swing in a vertical direction, means on the second lever to engage the edge portion of a record on the turntable, a third lever pivoted to swing vertically in engagement with the second lever and a second cam connected to the motor to engage the third lever.

18. In phonographs, a motor, a turntable, a lever pivoted to move vertically, a discard arm rigidly positioned on said lever, a roller on said arm, a wedge spaced from said roller, means to move the lever in a horizontal plane to insert the edge portion of a record between the roller and wedge, and means to move the lever in a vertical plane to tilt the record above the turntable.

19. In phonographs, a motor, a turntable, a lever pivoted to move horizontally and having a bearing near its pivot point, a second lever journalled at said bearing, means on the second lever to engage the edge of a record, and means to move the second lever about said bearing to cause it to engage the edge of the record, and means to move the first lever about its pivot to raise the second lever and the record engaged thereby.

20. In phonographs, a motor, a turntable, a lever pivoted to move horizontally, a second lever pivoted on the first lever near the pivot point thereof to move vertically, spaced abutments on the second lever, a third pivoted lever engaging the second lever, a cam rotated by said motor having a cam surface to move the first and third levers about their pivot points whereby the said abutments are caused to grasp the edge of a record on the turntable and tilt it thereabove.

ARTHUR B. WINCHELL.